(12) United States Patent
Hasebe et al.

(10) Patent No.: US 8,360,698 B2
(45) Date of Patent: Jan. 29, 2013

(54) CUTTING METHOD

(75) Inventors: Takao Hasebe, Niwa-Gun (JP);
Shunske Wakaoka, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 1265 days.

(21) Appl. No.: 12/138,821

(22) Filed: Jun. 13, 2008

(65) Prior Publication Data
US 2009/0000441 A1     Jan. 1, 2009

(30) Foreign Application Priority Data

Jun. 29, 2007   (JP) .................................. 2007-173151

(51) Int. Cl.
*B23B 35/00*       (2006.01)

(52) U.S. Cl. .......... 409/132; 409/136; 409/137; 408/61; 408/67

(58) Field of Classification Search ............... 408/56, 408/61, 67; 409/131, 132, 137, 135, 136
See application file for complete search history.

(56) References Cited

U.S. PATENT DOCUMENTS

| | | | | |
|---|---|---|---|---|
| 2,956,455 | A * | 6/1959 | Chaney | 408/56 |
| 3,555,937 | A * | 1/1971 | Nicodemus | 408/59 |
| 3,694,099 | A * | 9/1972 | Nicholas | 408/58 |
| 4,515,230 | A * | 5/1985 | Means et al. | 175/420.1 |
| 4,711,609 | A * | 12/1987 | Seefluth | 408/68 |
| 5,092,716 | A * | 3/1992 | Omi | 408/59 |
| 6,783,532 | B2 * | 8/2004 | Steiner et al. | 606/80 |
| 7,645,102 | B2 * | 1/2010 | Nomura et al. | 408/199 |
| 2008/0016783 | A1 * | 1/2008 | Eisner et al. | 51/298 |
| 2009/0060670 | A1 * | 3/2009 | Sugano et al. | 408/230 |
| 2010/0196114 | A1 * | 8/2010 | Sugano et al. | 409/137 |

FOREIGN PATENT DOCUMENTS

| | | | |
|---|---|---|---|
| CA | 2000054 C | | 7/1994 |
| CN | 1041906 A | | 5/1990 |
| DE | 3630706 A | * | 3/1988 |
| DE | 19512401 C1 | * | 4/1996 |
| GB | 1415137 A | * | 11/1975 |
| JP | 62-199339 | | 9/1987 |
| JP | 62199339 A | * | 9/1987 |

(Continued)

OTHER PUBLICATIONS

Oberg, E.; Jones, F.D.; Horton, H.L.; Ryffell, H.H. (2000). Machinery's Handbook (26th Edition). (pp. 1106-1115). Industrial Press.*

(Continued)

*Primary Examiner* — Daniel Howell
*Assistant Examiner* — Justin Sikorski
(74) *Attorney, Agent, or Firm* — Burr & Brown

(57) ABSTRACT

A cutting method capable of efficiently removing cutting chips around a cutting point with a little electric power, and cutting a work with high accuracy with a ball end mill. The ball end mill has a slit shaped-opening part at a portion adjacent to a rake face of a cutting edge in internal communication with a suction passage, and a work in which a cutting liquid is previously coated on an inclined face of the work is cut while the cutting liquid is sucked in the area around the cutting edge from the opening part through the suction passage. As a result of this, the cutting liquid in the area around the cutting edge is sucked from the opening part and a cutting power decreasing rate is higher than in a case where the suction is not carried out.

4 Claims, 6 Drawing Sheets

FOREIGN PATENT DOCUMENTS

| | | |
|---|---|---|
| JP | 01-135555 U | 9/1989 |
| JP | 06055401 A * | 3/1994 |
| JP | 08-290318 A1 | 11/1996 |
| JP | 2002321111 A * | 11/2002 |
| JP | 2003-094226 A1 | 4/2003 |
| JP | 2003-247006 A1 | 9/2003 |
| JP | 2004-322233 A1 | 11/2004 |
| JP | 2005145041 A * | 6/2005 |
| JP | 2010115763 A * | 5/2010 |

OTHER PUBLICATIONS

Tool Engineer, Jun. 2007, pp. 38-43.
Japanese Office Action dated Mar. 6, 2012.
Japanese Office Action, Japanese Application No. 2007-173151, dated May 22, 2012 (3 pages).

* cited by examiner

CUTTING METHOD

BACKGROUND OF THE INVENTION

This application claims the entire benefit of Japanese Patent Application No. 2007-173151 filed on Jun. 29, 2007 the entirety of which is incorporated by reference.

FIELD OF THE INVENTION

The present invention relates to a cutting method for cutting a work, which is made of a metal or the like, by using a cutting tool having a cutting edge.

Background Art

In a case of cutting a work made of a metal or the like by using a cutting tool having a cutting edge, cutting chips are generated during cutting of a work (a substance to be cut). When cutting is carried out where the cutting chips are accumulated on a surface of the work, a cutting edge is caught in the accumulated cutting chips resulting in damage of the cutting edge or a decrease of accuracy of cutting work. Further, since the cutting chips are heated at a high temperature due to friction, the cutting edge or the work is thermally deformed, which decreases cutting accuracy when the cutting chips are accumulated on the surface of the work. Therefore, as disclosed in document 1, a method to remove cutting chips accumulated on a cutting point (a contacting point of a cutting edge and a work) is known. This method includes steps of providing a large cover for covering a cutting tool and a holder supporting the cutting tool, sucking cutting chips under the cover by a powerful suction device, and thereby removing cutting chips around the cutting point.

Non-patent document 1: "Tool Engineer, June, 2007"

SUMMARY OF THE INVENTION

However, as the method disclosed in the document 1 is to suck cutting chips under a cover which covers a cutting tool and a holder an applicable tool is limited. Thus, this method is hardly used for a device using many kinds of tools such as a machining center. Further, since it is necessary to cover a whole cutting tool with a cover, this method cannot be used for a machine tool having an ATC (automatic tool changer). In addition, since it is necessary to use a powerful suction device in order to collect cutting chips scattered from a cutting point due to a centrifugal force, large electric power is required.

An object of the present invention is to provide a cutting method capable of efficiently removing cutting chips from around a cutting work point with a reduced electric power use, and while cutting the work with high accuracy.

A first aspect of the present invention is a cutting method for cutting a work by using a cutting tool having a cutting edge at a tip thereof, wherein the cutting tool moves relatively with respect to the work. In the cutting method, the cutting tool includes a slit shaped-opening part at a portion adjacent to a rake face of the cutting edge, and internally includes a suction passage communicated with the opening part. The cutting method includes steps of providing a cutting liquid around the cutting point; applying a negative pressure in the suction passage; and cutting the work while sucking the cutting liquid around the cutting point from the opening part by means of the negative pressure.

A second aspect of the present invention is the cutting method for cutting a work according to the first aspect, wherein the cutting liquid is non water-miscible cutting oil.

A third aspect of the present invention is the cutting method for cutting a work according to the first aspect, wherein the cutting liquid is water-miscible cutting fluid.

In the cutting methods of the first to third aspects, a medium around the cutting point is not limited to air, and the medium can be substituted by a gas other than air or a liquid. Further, either the non water-miscible oil or the water-miscible cutting fluid around the cutting point can be sprayed and coated to the work, and can be supplied to the cutting point by making it to be a mist state during the cutting.

A fourth aspect of the present invention is the cutting method for cutting a work, wherein the cutting liquid is previously coated to a cutting face of the work so as to exist around the cutting point.

According to the first aspect of the present invention, cutting chips can be quickly removed from a cutting point with low energy by sucking a cutting liquid at the cutting point from the slit shaped-opening part through the suction passage.

According to the second aspect of the present invention, cutting chips can be efficiently removed from the cutting point with low energy by sucking non water-miscible cutting oil at the cutting point from the slit shaped-opening part through the suction passage so as to generate high speed air flow along the rake face of the cutting edge, and urging the cutting chips to be collected by the non water-miscible cutting oil on the rake face. Further, in a case of using MQL (Minimum Quantity Lubrication; a method for supplying a very small quantity of a cutting liquid in a mist state to a part near a cutting point), even if a direction of a nozzle for spraying mist of non water-miscible cutting oil is not correctly adjusted, lubrication property by the cutting liquid can be highly kept. Therefore, by the cutting method of the second aspect, a work can be cut with high accuracy.

According to the third aspect of the present invention, water-miscible cutting fluid is sucked at the cutting point from the slit shaped-opening part through the suction passage. Thereby, the vapor of the cutting liquid evaporated by cutting heat can be rapidly sucked, a vapor pressure around the cutting point can be kept to be low, and the continuously-generated cutting heat (frictional heat) can be effectively removed. Thus, an increase of temperature around the cutting point can be efficiently suppressed. Further, in a case of using MQL, even if the direction of the nozzle for spraying mist of water-miscible cutting fluid is not correctly adjusted, an increase of temperature around the cutting point can be efficiently suppressed. Therefore, a work can be cut with high accuracy.

According to the fourth aspect of the present invention, the cutting liquid is previously coated on the cutting face of the work so that the cutting liquid is placed around the cutting point. Thus, it is not necessary to use the nozzle for spraying the mist of the cutting liquid, which reduces the cost.

DETAILED DESCRIPTION OF THE INVENTION

Figure 1A:
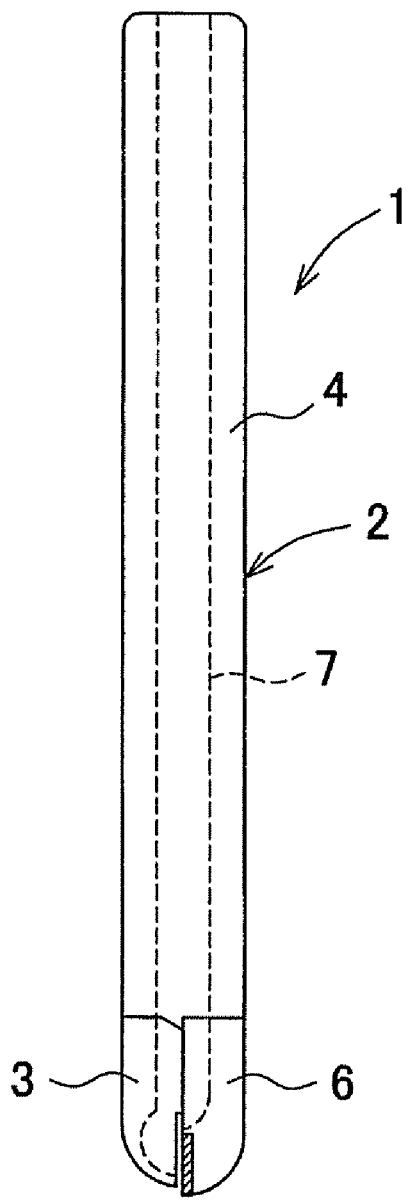
FIG. 1 is a front face view of a ball end mill (FIG. 1A is a whole view, and FIG. 1B is an enlarged view of a tip portion)

One embodiment of a cutting method of the present invention (using a ball end mill as a cutting tool) will be described below referring to the drawings.

[Structure of a Ball End Mill]

Figure 1B:
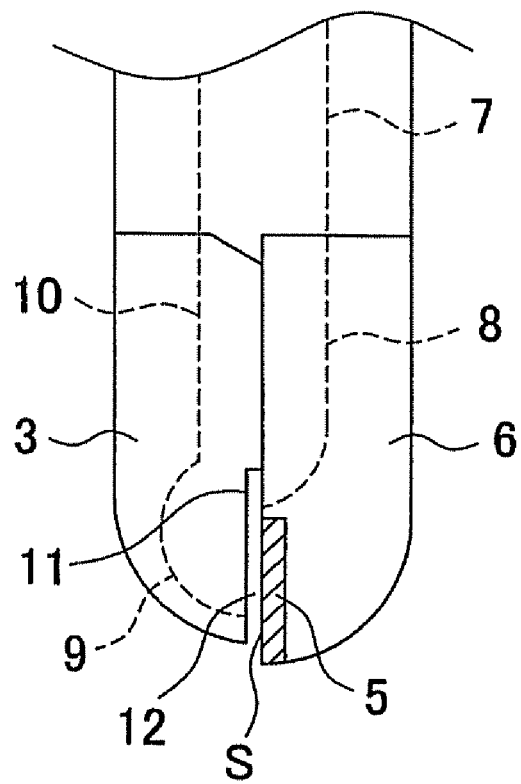
Figure 2A:
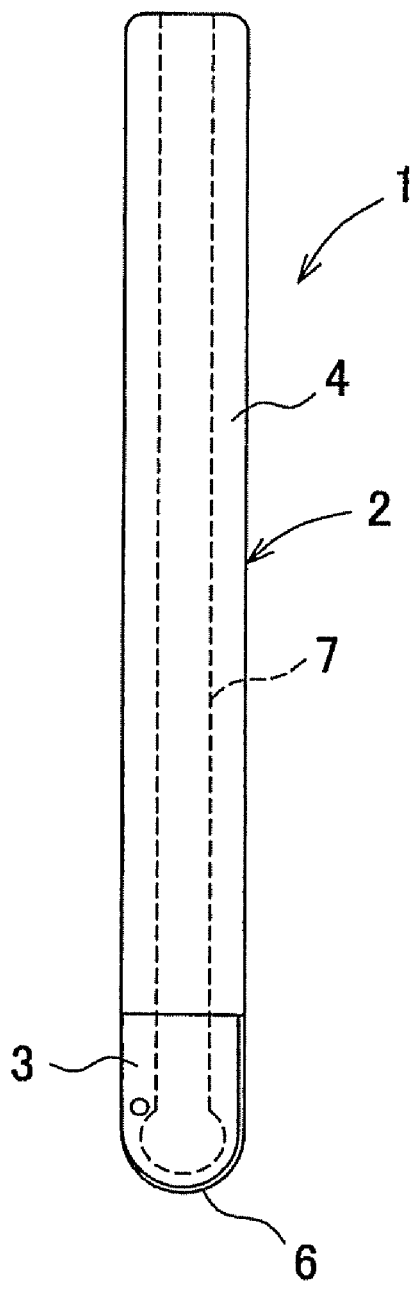
FIG. 2 is a left side face view of a ball end mill (FIG. 2A is a whole view, and FIG. 2B is an enlarged view of a tip portion)
Figure 2B:
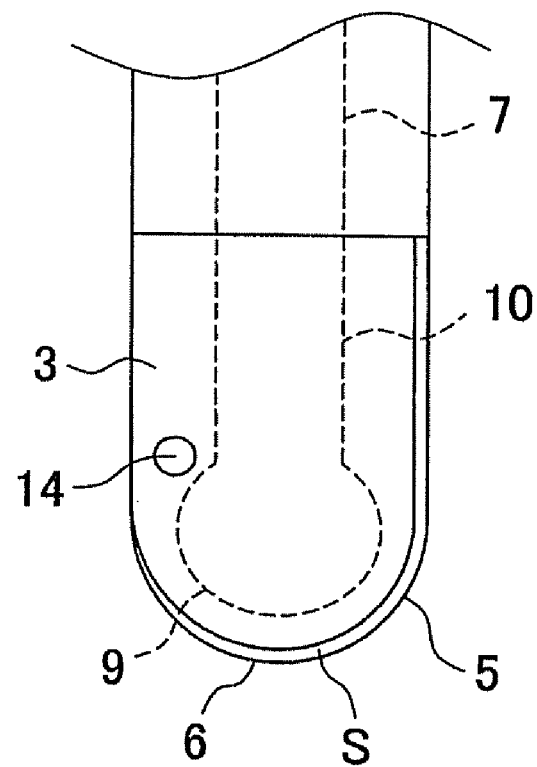
Figure 3:
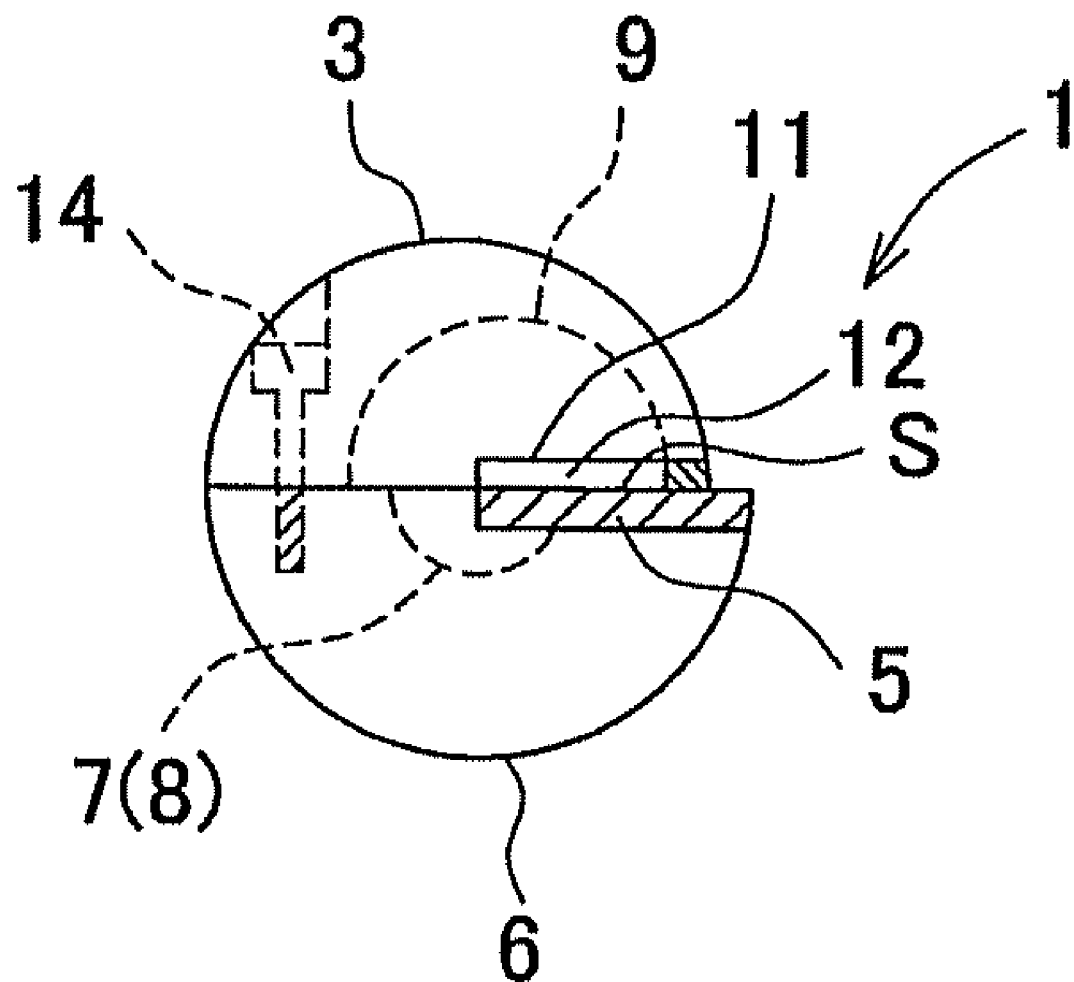
FIG. 3 is a bottom face view of a ball end mill.

FIGS. 1 to 3 illustrate a front face, a left side face and a bottom face of a ball end mill. A ball end mill 1 includes an end mill body 2 made of a metal (a cemented carbide), and a cover 3 made of a metal (a cemented carbide). The end mill body 2 includes a head part 6 integrally provided at a tip of a shank 4, and the length of the end mill body 2 is approximately 90 mm. The shank 4 is in a cylindrical shape having an approximately 10 mmϕ and includes a suction passage (a cave) 7 having a cylindrical shape of an approximately 5 mmϕ at a substantial center of the shank 4 (therefore, the cross sectional area of the suction passage 7 is about 19.6 mm$^2$). The head part 6 is in a shape that a semi-sphere is connected onto a tip of a semi-pillar of an approximately 10 mmϕ (this shape is like a shape dividing a bell into two parts in a longitudinal direction). Further, the head part 6 includes a cutting edge 5 having a circular shape (having a circumference of about ¼) in the semi-sphere portion at a tip thereof, and the cutting edge 5 is along a ridgeline between a flat face on the inner side and a spherical face on the outer side of the semi-sphere. The flat portion on the inner side is a rake face S. Further, a semi-pillar suction groove 8 is engraved at a slightly upper portion than the height of a base end of the cutting edge 5, and this suction groove 8 is communicated with the suction passage 7 in the shank 4. In addition, a screw groove (not shown) to be screwed with the cover 3 is on an opposite side (a back side of a paper in FIG. 1) of the cutting edge 5 side.

Further, the cover 3 is in a shape that a semi-sphere is connected onto a tip of a semicircular column, like the head part 6 (in addition, a diameter of the cover is slightly smaller than the head part 6). Further, the cover 3 includes a semi-spherical suction recessed part 9, which is slightly smaller than the cover 3, on an inner side of a semi-sphere portion on the tip side thereof, and is communicated with a semicircular column suction groove 10 on a base end side of the suction recessed part 9. Furthermore, the cover 3 includes a notch 11 having a circular shape (a circumference shape of about ¼) at a tip thereof, and this notch 11 has a fixed width. In addition, the cover 3 includes a screw hole (not shown) on an opposite side (the back side in FIG. 1) of the notch 11 side of the cover 3. The screw hole is bored to screw the cover 3 to the head part 6 of the end mill body 2.

The cover 3 is screwed to the head part 6 using a screw 14 in a state that a flat face on an inner side contacts to a flat face of the head part 6 of the end mill body 2. Further, in a state that the cover 3 is screwed to the head part 6 of the end mill body 2, a series of caves are formed with the suction recessed part 9 and the suction groove 10 of the cover 3 and with the suction groove 8 and the suction passage 7 of the head part 6 of the end mill body 2. Further, in the state that the cover 3 is screwed to the head part 6 of the end mill body 2, the tip of the cover 3 is placed more on the upper side than the tip of the cutting edge 5 by a feed quantity per one edge (that is, a feed quantity per one rotation of a ball end mill attached to a main spindle device). In addition, in the state that the cover 3 is screwed to the head part 6 of the end mill body 2, an opening part (having a space of an area of 5 mm$^2$) 12 in a slit shape (a belt shape having a fixed width) are formed with the notch 11 of the cover 3. This slit shaped-opening part 12 is curved in a circular shape (a circumference shape of about ¼) so as to be adjacent to the rake face S of the cutting edge 5 of the end mill body 2.

Figure 4:
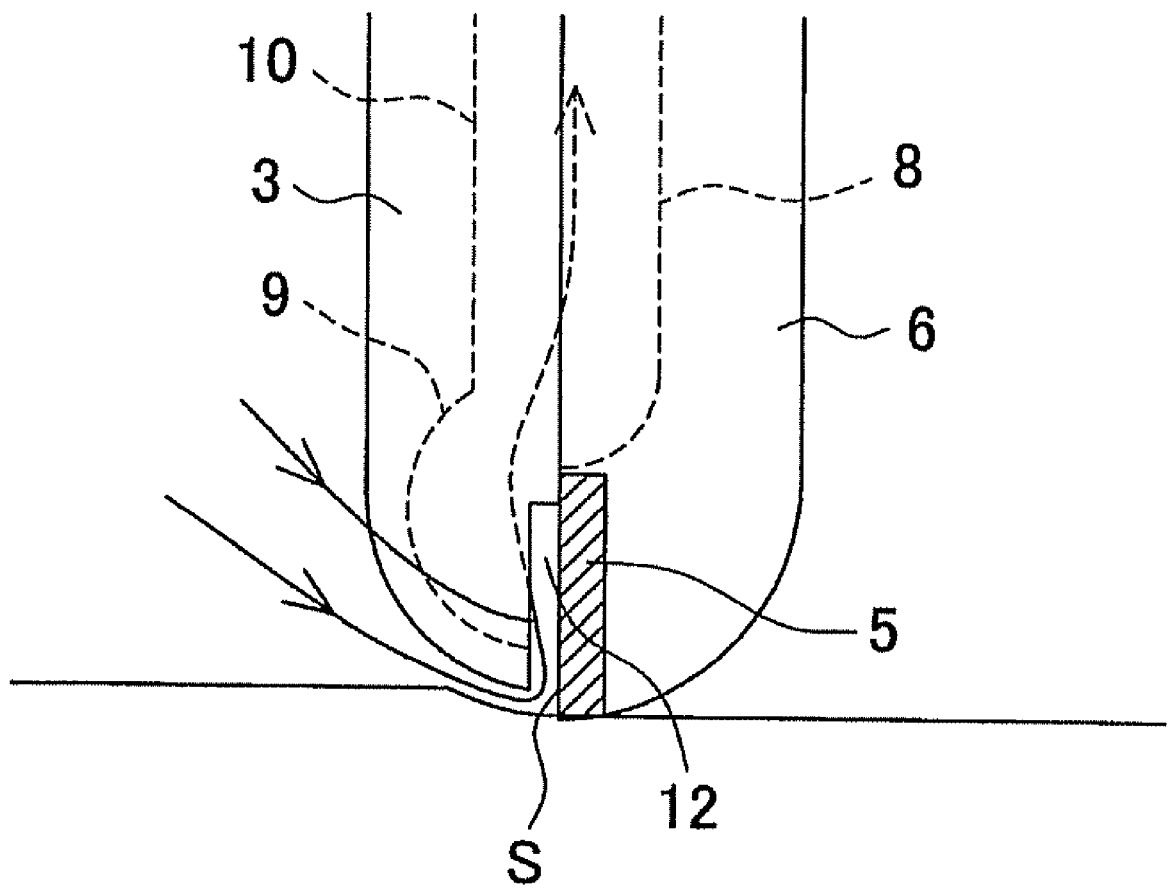
FIG. 4 is a view to illustrate a state that air is sucked-in from a slit shaped-opening part.
Figure 5:
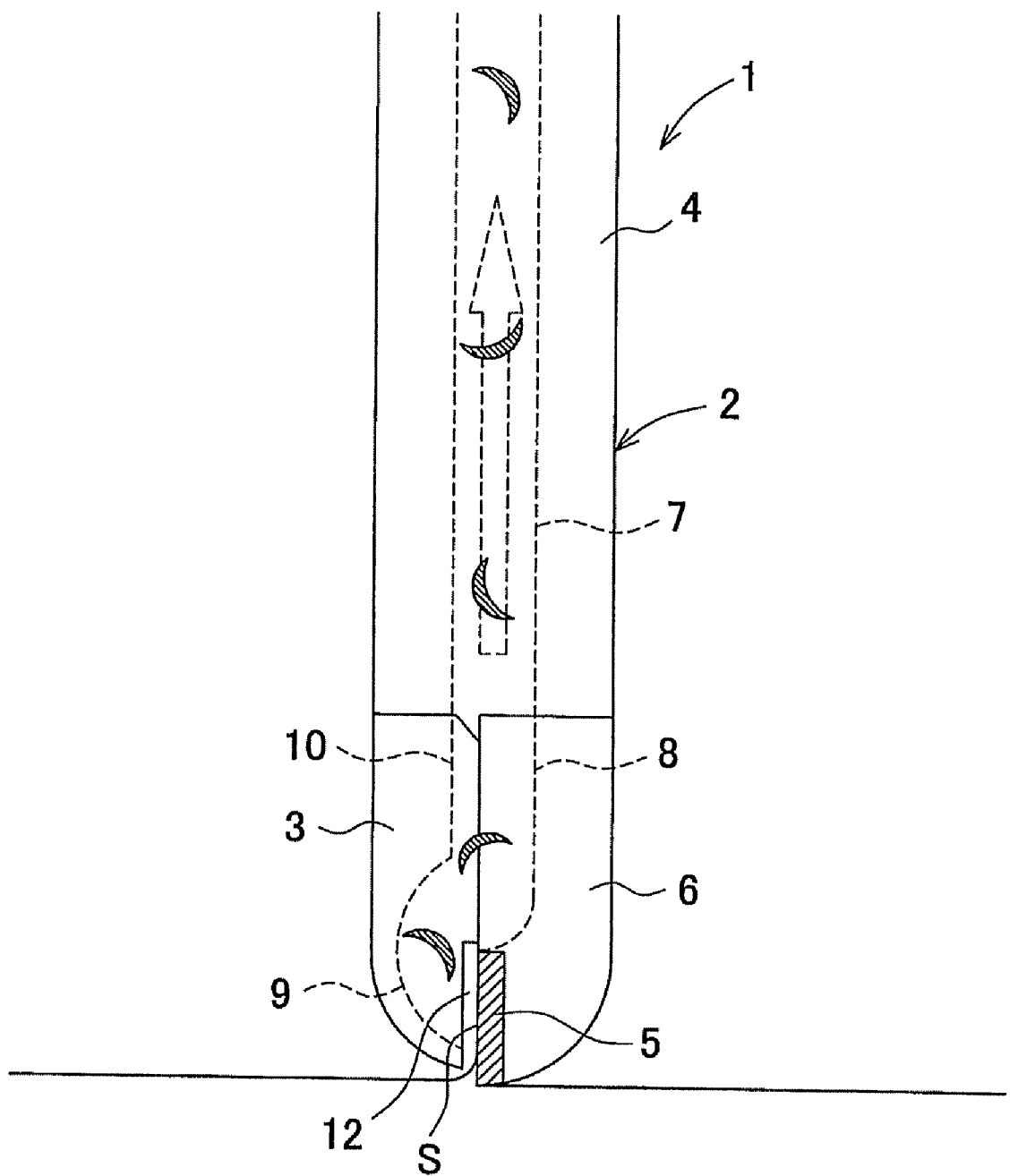
FIG. 5 is a view to illustrate a state that cutting chips around a cutting point are removed.

The ball end mill 1 having the above-described constitution can generate a high speed air flow by applying a negative pressure in the suction passage 7. The air flows to a cutting chips exhausting passage in a holder (not shown) through an area around the cutting point by the cutting edge 5, the slit shaped-opening part 12, the rake face S of the cutting edge 5, and the suction passage 7, as shown in FIG. 4. Therefore, the cutting chips can be efficiently removed from the cutting point with low energy (see FIG. 5).

Further, when the high speed air flow is generated along the rake face S of the cutting edge 5, fresh air (or the other substituted medium) is constantly supplied to the area around the cutting point. Thus, the cutting liquid around the cutting point can be efficiently sucked so that the cutting chips are gathered at the cutting point. Thereby, the cutting chips on the rake face S can be easily collected. In addition, in the ball end mill 1, since the vapor of the cutting liquid evaporated by cutting heat is rapidly sucked, the vapor pressure around the cutting point is kept to be low. Thus, an effect to remove the continuously-generated cutting heat can be kept high.

[Cutting Using a Ball End Mill]

Figure 6:
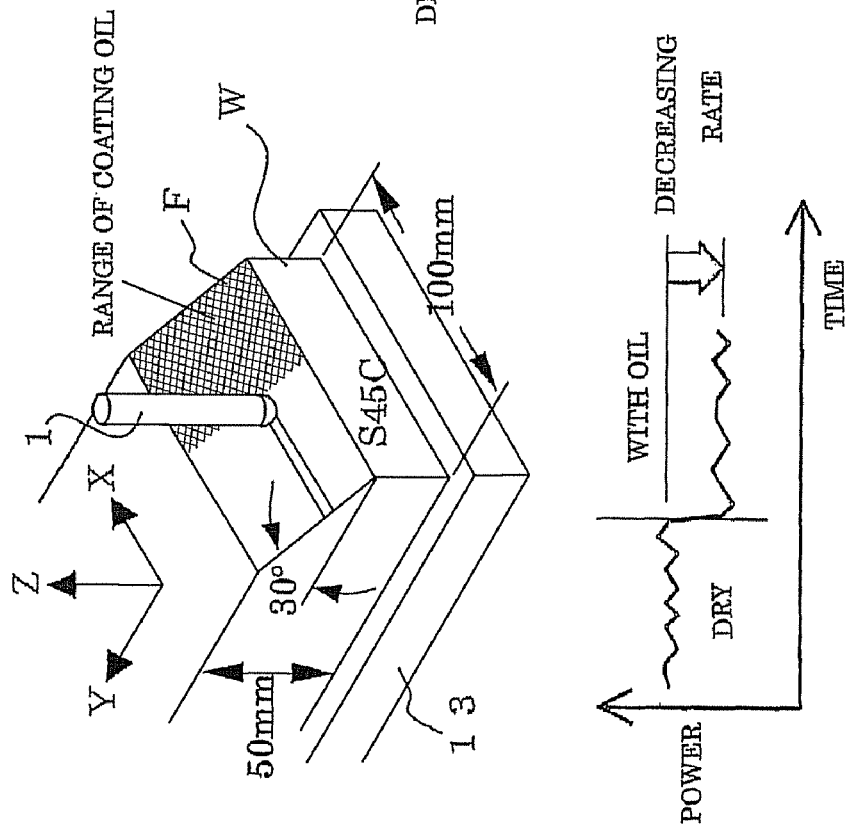
FIG. 6 is a view to illustrate the state of cutting using a ball end mill.

When a metal work was cut using the ball end mill 1 having the above-described constitution, the following lubricious efficiency was obtained. As shown in FIG. 6, the work was cut by using a main spindle device (not shown) to which the ball end mill 1 is attached, and providing a groove having a predetermined depth at an inclined face (having an inclining angle of 30 °) on the work W. Further, cutting was carried out in a state that an oil as non water-miscible cutting oil was previously coated on the inclined face F of the work W. In the cutting, a suction device (not shown) having 1 kw electric power was connected with the main spindle device having the ball end mill 1, and the cutting liquid in the suction passage 7 in the ball end mill 1 was sucked. In addition, when the cutting liquid was sucked by the suction device, an output was adjusted so as to be 40 liter/minute (therefore, the rate of a sucked material passing the opening part 12 was 133 m/second, and the rate of the sucked material passing the suction passage 7 was 20 m/minute, on calculation). Furthermore, a cutting state of the work W after cutting as described above was visually observed.

In order to measure lubricous efficiency of the oil, the cutting was carried out while placing the work W on a vibration measuring device 13, and the power (vibration value) in case of carrying out cutting not using an oil (dry cutting) and the power in case of carrying out cutting using an oil (wet cutting) were respectively calculated. Based on these values, a cutting power decreasing rate (%) was calculated with a below indicated formula 1. Further, in order to confirm the effects of suction and a mounted cover, cutting was carried out in the following four patterns, that is, (i) with suction and a cover, (ii) with suction and without a cover, (iii) without suction and with a cover, and (iv) without suction and a cover.

Cutting power decreasing rate=(power at dry cutting−power at wet cutting)/power at dry cutting×100          Formula 1

Figure 7:
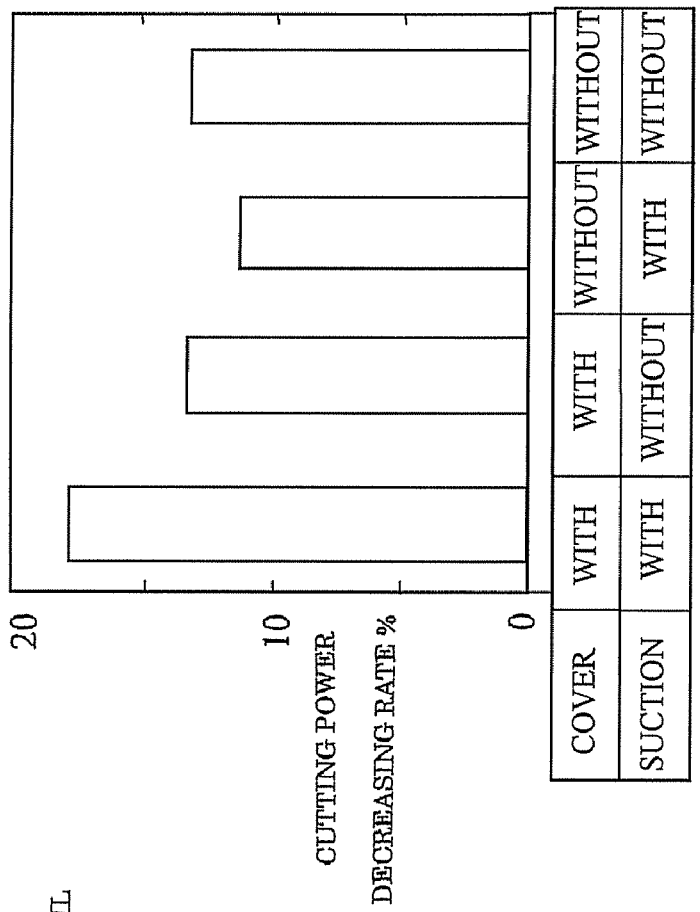
FIG. 7 is a graph showing a cutting power decreasing rate measured in cutting using a ball end mill.

As a result of carrying out cutting with the above-described four patterns, when cutting was carried out while the cutting liquid with the cover 3 mounted on the tip of the ball end mill 1 was sucked, the cutting face of the work W was remarkably improved. Further, FIG. 7 illustrates a cutting power decreasing rate (%) when cutting was carried out with the above-described four patterns (i) to (iv). When cutting was carried out while the cutting liquid with the cover 3 mounted on a tip of the ball end mill 1 was sucked, the cutting power decreasing rate (%) was larger than the other cases, and the lubricious efficiency was remarkably high.

In the above-described cutting method using the ball end mill 1, the work W is cut by steps of providing the oil around a cutting point, applying a negative pressure in the suction passage 7, and sucking the oil around the cutting point from the opening part 12. Thus, cutting chips can be efficiently removed from the cutting point with low energy by generation of a high speed air flow along the rake face S of the cutting edge 5, and urging the cutting chips to be collected by the oil on the rake face S. Therefore, by the above-described cutting method, the work W can be cut with high accuracy.

Further, in the above-described cutting method, the oil is previously coated on the cutting face F of the work W so as to exist around the cutting point. Thus, it is not necessary to use a nozzle for spraying mist of a cutting liquid, so that the work W can be cut with a low cost.

In addition, the cutting method of the present invention is not limited to the above-described embodiment. The constitutions of a kind of the cutting tool, a kind of the cutting liquid, a method to providing the cutting liquid around the cutting point, and an output of the suction device can be properly changed within a range of the objective of the present invention.

For example, the cutting tool used in the cutting method of the present invention is not limited to the ball end mill that is the above-described embodiment, the other end mill or a drill can be used. Further, a cover is not limited to a metallic cover, and a cover made of a material other than a metal, e.g., ceramics, can be used. Furthermore, a cutting tool used in the cutting method of the present invention is not limited to that of the above-described embodiment in which a cover having a shape formed by connecting a semi-sphere onto a tip of a semicircular column is fixed at a tip of a tool main body. A shape of a tool main body and a shape of a cover can be changed if necessary.

Further, the cutting method of the present invention is not limited to the above-described embodiment using oil. The method using water-miscible cutting fluid can be used. Non water-miscible cutting oil and water-miscible cutting fluid may be used together by a case. Further, the cutting method of the present invention is not limited to the method for cutting a work in air, and a work can be cut under an atmosphere in which air is exchanged by other gases. Furthermore, a work to be cut is not limited to that made of a metal, and a work made of a nonmetal such as a resin or a ceramics can be used.

The cutting method of the present invention has an excellent effect, and can be preferably used for cutting various kinds of a work.

What is claimed is:

1. A cutting method for cutting a work, the method comprising:
   using a cutting tool having a cutting edge at a tip thereof; and
   moving the cutting tool relatively with respect to the work, wherein:
   the cutting tool includes a cutting edge having a flat rake face at a tip thereof and a cover having a fixed width notch in a belt shape in an opening part adjacent to the rake face of the cutting edge, and the cutting tool internally includes a suction passage in communication with the opening part, and
   the cutting method further comprising:
   providing a cutting liquid by spraying a small quantity of the cutting liquid in a mist state while rotating the cutting tool around a cutting point;
   applying a negative pressure in the suction passage while rotating the cutting tool; and
   cutting the work while the cutting liquid is sucked from around the cutting point through the opening part of the cutting tool by the negative pressure in the suction passage.

2. The cutting method for cutting a work according to claim 1, wherein the cutting liquid is non water-miscible cutting oil.

3. The cutting method for cutting according to claim 1, wherein the cutting liquid is water-miscible cutting fluid.

4. The cutting method according to claim 1, wherein the cutting liquid is previously coated on a cutting face of the work so as to exist around the cutting point.

* * * * *